United States Patent

Saitoh et al.

Patent Number: 5,965,248
Date of Patent: Oct. 12, 1999

[54] MAGNETIC RECORDING MEDIUM

[75] Inventors: Akira Saitoh; Yutaka Takahashi; Satoru Tsuchida, all of Nagano, Japan

[73] Assignee: TDK Corporation, Tokyo, Japan

[21] Appl. No.: 08/996,882

[22] Filed: Dec. 23, 1997

[30] Foreign Application Priority Data

Dec. 27, 1996 [JP] Japan ...................... 8-350484

[51] Int. Cl.⁶ .................................................. G11B 5/706
[52] U.S. Cl. .................. 428/216; 428/328; 428/694 BA; 428/694 BS; 428/900
[58] Field of Search ..................... 428/216, 328, 428/694 BA, 694 BS, 900

[56] References Cited

U.S. PATENT DOCUMENTS

| | | | |
|---|---|---|---|
| 5,405,679 | 4/1995 | Isobe | 428/212 |
| 5,527,603 | 6/1996 | Isobe et al. | 428/323 |
| 5,580,399 | 12/1996 | Tamai et al. | 148/301 |
| 5,591,535 | 1/1997 | Hisano et al. | 428/694 RE |
| 5,714,275 | 2/1998 | Yamazaki et al. | 428/694 B |
| 5,770,302 | 6/1998 | Masaki et al. | 428/323 |
| 5,795,642 | 8/1998 | Ishikawa et al. | 428/141 |
| 5,795,645 | 8/1998 | Takahashi et al. | 428/216 |

FOREIGN PATENT DOCUMENTS

| | | |
|---|---|---|
| 1-018961 | 4/1989 | Japan . |
| 1-102037 | 4/1996 | Japan . |

*Primary Examiner*—Stevan A. Resan
*Attorney, Agent, or Firm*—Stephen F.K. Yee

[57] ABSTRACT

A magnetic recording medium having excellent electromagnetic characteristics in the medium and high frequency regions has a magnetic layer formed on a non-magnetic support or a non-magnetic under layer, said magnetic layer comprising a magnetic metal powder containing iron (Fe) as a main component, 18 to 40% by weight of Co based on iron, Al and Y or a rare earth element, and having a specific surface area (x) by the BET method not exceeding 60 m²/g, in which said magnetic metal powder has a saturation magnetization (σs) (y) and a specific surface area (x) by the BET method within the range bounded by the following four equations:

$$y = 0.05x^2 - 6x + 330 \quad (1)$$

$$y = 0.05x^2 - 6x + 310 \quad (2)$$

$$y = x + 126 \quad (3)$$

$$y = x + 104 \quad (4)$$

11 Claims, 1 Drawing Sheet

MAGNETIC RECORDING MEDIUM

FIELD OF THE INVENTION

The present invention relates to a coat type magnetic recording medium having excellent electromagnetic characteristics in the medium and high frequency regions, and particularly having characteristics suitable for a digital recording medium.

BACKGROUND OF THE INVENTION

With the recent diffusion of large-capacity recording devices, a desired objective has been to increase that the density of magnetic recording. To meet this demand, magnetic metal powders high in coercive force and saturation magnetization have been mainly used.

Further, the recent rapid spread of digital recording media requires further increases in density and improvements in characteristics of the magnetic metal powders, and magnetic recording media complying with these demands have been proposed.

For example, Japanese Patent Unexamined Publication No. 8-102037 discloses "a magnetic recording medium comprising a support and a plurality of layers formed thereon, said layers containing a non-magnetic layer and a magnetic layer, wherein a ferromagnetic powder (A) contained in the magnetic layer contains 2 to 20 parts by weight of Al, 10 to 60 parts by weight of Co and 1 to 16 parts by weight of at least one rare earth element selected from the group consisting of Sm, Y, Pr, Nd and La, based on 100 parts by weight of Fe; the saturation magnetization (σs) thereof is 130 to 170 emu/g; when the average length of the major axis of the ferromagnetic powder (A) is taken as La (nm), the axis ratio thereof as Xa, the average length of the major axis of the ferromagnetic powder (B) as Lb (nm), and the axis ratio thereof as Xb, $30 \leq La \leq 110$, $3 \leq Xa \leq 8$, $La \leq Lb$, $80 \leq Lb \leq 280$ and $5 \leq Xb \leq 12$; and the average surface roughness (Ra) of the uppermost magnetic layer is 0.0005 to 0.006 μm". Japanese Patent Examined Publication No. 1-18961 and Japanese Patent Unexamined Publication No. 60-36603 disclose "a magnetic metal powder having a major axis diameter of 0.05 to 0.2 μm and an axis ratio of 4 to 8, wherein the specific surface area measured by allowing $N_2$ gas to be adsorbed by the BET method is 30 to 55 m²/g, and the coercive force Hc is 1300 Oe or more and the saturation magnetization is 120 emu/g or more, for the magnetic characteristics thereof".

In the above-mentioned prior-art magnetic recording medium described in Japanese Patent Unexamined Publication No. 8-102037, the magnetic metal powder has the following composition:

Co: 1 to 60% by weight

Rare earth element: 1 to 16% by weight

σs: 130 to 170 emu/g

Length of major axis: 0.03 to 0.11 μm

The C/N in the high frequency region is improved by increasing Co. However, an Fe/Co alloy theoretically gives the maximum magnetic energy at 70/30, so that 40% or more of Co is not necessary if Co is homogeneously alloyed with Fe. However, in a magnetic metal powder generally produced, the distribution of Co is non-uniform. Accordingly, 40% or more of Co may be sometimes required for improvements in characteristics, which causes a partial excess of Co in some portions. As a result, the addition of 40% or more of Co is liable to make the characteristics of the magnetic metal powder non-uniform or unstable, resulting in failure to industrially obtain a medium with excellent characteristics.

The magnetic metal powder used herein has a specific surface area by the BET method (hereinafter also briefly referred to as a BET value) as large as 60 m²/g and non-uniform as described above, resulting in considerable deterioration of dispersibility. The coated surface is therefore degraded, and the characteristics as a tape are not improved in many cases.

In a magnetic recording medium described in Japanese Patent Examined Publication No. 1-18961, the magnetic metal powder having high magnetic energy is produced by decreasing pores and homogenizing net Fe by specifying the form of spindle-shaped goethite. Because of decreased pores, the BET value is lowered, and the dispersibility is improved, thereby causing little trouble in the production of the medium.

However, the magnetic metal powder in which only the Fe element is used has a limitation on magnetic energy, and is inferior to a magnetic metal powder to which Co is added (Co-addition type magnetic metal powder) in its medium characteristics.

In almost all of the Co-addition type magnetic metal powders, including the magnetic recording medium described in Japanese Patent Unexamined Publication No. 8-102037, spindle-shaped goethite is used as a raw material. The measure for the magnetic recording medium described in Japanese Patent Examined Publication No. 1-18961 does not lead to improvements in the characteristics of the Co-addition type magnetic metal powders, particularly an increase in magnetic energy and a decrease in BET value.

SUMMARY OF THE INVENTION

An object of the present invention is to provide a coat type magnetic recording medium having excellent characteristics in the medium and high frequency regions, necessary for a digital recording medium, using an improved Co-addition type magnetic metal powder.

In order to solve the above-mentioned problems, the present inventors have conducted intensive investigation. As a result, the present inventors have discovered that the above-mentioned problems can be solved by using a magnetic metal powder containing Fe as a main component, Co, Al and, Y or a rare earth element in a magnetic layer, said magnetic metal powder having a saturation magnetization (σs) (y) and a specific surface area (x) by the BET method within the range bounded by four specified equations, thus completing the present invention.

That is, the present invention provides (1) a magnetic recording medium having a magnetic layer formed on a non-magnetic support or a non-magnetic under layer, said magnetic layer comprising a magnetic metal powder containing iron (Fe) as a main component, 18 to 40% by weight of Co based on iron, Al and Y or a rare earth element, and having a specific surface area (x) by the BET method not exceeding 60 m²/g, in which said magnetic metal powder has a saturation magnetization (σs) (y) and a specific surface area (x) by the BET method within the range bounded by the following four equations:

$$y=0.05x^2-6x+330 \qquad (1)$$

$$y=0.05x^2-6x+310 \qquad (2)$$

$$y=x+126 \qquad (3)$$

$$y=x+104 \qquad (4)$$

and, (2) the magnetic recording medium described in (1) described above, in which said rare earth element is one selected from the group consisting of Nd, Sm, Pr, La, Ce, Dy, Gd and Tb.

DESCRIPTION OF THE PREFERRED EMBODIMENTS

Figure 1:
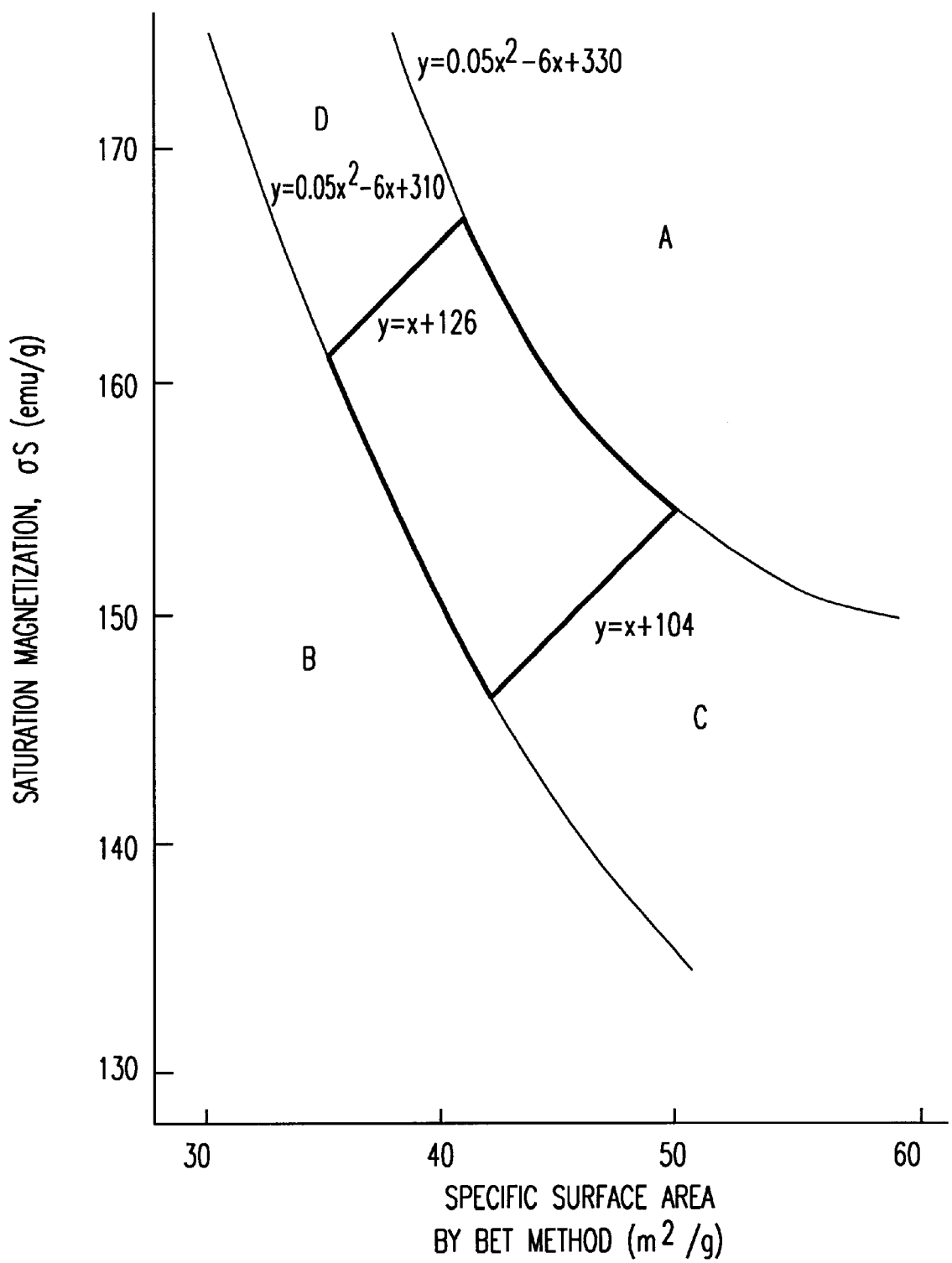
FIG. 1 is a graph showing the range bounded by equations of saturation magnetization ($\sigma s$) (y) and specific surface area (x) by the BET method of a magnetic metal powder used in the present invention.

As described above, in the magnetic recording medium of the present invention, a magnetic layer comprises a magnetic metal powder containing iron (Fe) as a main component, 18 to 40% by weight of Co based on iron, Al and Y or a rare earth element selected from Nd, Sm., Pr, La, Ce, Dy, Gd and Tb, and having a specific surface area (x) by the BET method not exceeding 60 m$^2$/g, in which said magnetic metal powder has a saturation magnetization ($\sigma s$) (y) and a specific surface area (x) by the BET method within the range bounded by the following four equations (see FIG. 1):

$$y=0.05x^2-6x+330 \qquad (1)$$

$$y=0.05x^2-6x+310 \qquad (2)$$

$$y=x+126 \qquad (3)$$

$$y=x+104 \qquad (4)$$

The use of the magnetic metal powder within this range can provide the coat type magnetic recording medium having excellent characteristics of the medium and high frequency regions necessary for a digital recording medium. However, when the BET value (x) of the magnetic powder exceeds 60 m$^2$/g, it becomes difficult to maintain high dispersing properties required for obtaining a thin-layer digital magnetic recording medium. It is therefore required that x does not exceed 60 m$^2$/g.

When the characteristics of a Co-containing magnetic metal powder containing a certain amount of Co are intended to be improved in a certain determined composition and production process without changing the length of the major axis and the crystallite size (Dx), measures for mainly decreasing pores, lattice defects, strains and surface unevenness of the magnetic powder (namely, for decreasing the BET value) are studied.

When the characteristics of the magnetic powder are improved at determined amounts of FeOOH, Co and other additives used in a definite production process by the above-mentioned measures without changing the length of the major axis and the Dx, the BET value and the characteristics (here, $\sigma s$) of the magnetic metal powder vary on a certain determined curve.

Accordingly, the magnetic metal powder having a BET value and a $\sigma s$ deviating from the determined curve without changing the amounts of FeOOH and Co varies in the length of the major axis and the Dx, which causes an increase in noise and deterioration of dispersibility and coating quality.

When the above-mentioned respective equations are not satisfied, disadvantages as shown below appear.
In the case of y>0.05x$^2$-6x+330 (region A of FIG. 1)

In this case, the Dx is relatively increased to improve the $\sigma s$. Because of increased Dx, the noise is increased in the medium, which causes deterioration of C/N. This case is therefore unsuitable for the digital medium. Furthermore, when Dx is increased, the surfaces of magnetic powders tends to be rough and the coated surface is deteriorated, resulting in poor electromagnetic characteristics when producing the magnetic medium therewith.
In the case of y<0.05x$^2$-6x+310 (region B of FIG. 1)

In order to increase the $\sigma s$, the amount of an oxide coating is relatively decreased, so that a large quantity of FeOOH must be used. Accordingly, the length of the major axis of the magnetic metal powder becomes considerably large. In the method for producing the magnetic metal powder requiring such material selection, this shows the tendency that the Hc of the magnetic metal powder is difficult to be increased, and the high frequency characteristics necessary for the digital medium can not be obtained when it is used in the medium. When the length of the axis is kept small, the characteristics (saturation magnetization $\sigma s$) of the magnetic metal powder can not be improved, and the absolute value of an output of the medium is apt to be decreased.
In the case of y<0.05x$^2$-6x+330, y>0.05x$^2$-6x+310 and y<x+104 (region C of FIG. 1)

In this case, the magnetic metal powder has many pores, lattice defects, lattice strains and surface unevenness, the BET value is high, and the $\sigma s$ is low. As the BET value is high for the $\sigma s$, the dispersibility is inferior and the stability of a paint is poor. Further, as a result, a coated surface of the medium is deteriorated, so that the characteristics of the medium are not improved.
In the case of y<0.05x$^2$-6x+330, y>0.05x$^2$-6x+310 and y>x+126 (region D of FIG. 1)

In this case, the magnetic metal powder has only small numbers of pores, lattice defects, lattice strains and surface unevenness, the BET value is low, and the $\sigma s$ is high. This region is ideal as properties of magnetic metal powders but it is difficult to produce such powders.

In the present invention, the magnetic metal powder containing iron as a main component, a specific amount of Co, Al and Y or a rare earth element selected from Nd, Sm, Pr, La, Ce, Dy, Gd and Tb, and having a BET value not exceeding 60 m$^2$/g is used in the magnetic layer.

The amount of Co contained in the magnetic metal powder is 18 to 40% by weight. If the amount of Co is less than 18% by weight, an improvement in magnetic energy can not be expected. Exceeding 40% by weight results in non-uniform characteristics of the magnetic metal powder. Further, when Al is not used, there is the possibility of sintering of the magnetic metal powder, or reduced strength of the magnetic metal powder. When a rare earth element such as Y or Nd is not used, there is the possibility of sintering of the magnetic metal powder, similarly to Al. Furthermore, it is necessary to use both Al and Y, or Al and a rare earth element such as Nd. When Al, Y or a rare earth element such as Nd is not used, sintering of the magnetic metal powder may occur.

The ratio of $\sigma s$ to Dx in the magnetic metal powder, $\sigma s$/Dx, is preferably 0.90 or more. According to the present invention, a magnetic metal powder having high magnetic energy and excellent dispersibility and coating quality is obtained by fulfilling the above-mentioned requirements, and a digital magnetic recording medium having excellent medium and high frequency outputs and C/N is obtained.

The magnetic metal powder used in the present invention may be produced by any method. For example, the magnetic metal powder can be produced in the following manner.
(Production of Magnetic Metal Powder)

The iron magnetic metal powder is preferably produced by adding an alkali carbonate to a solution of a ferrous salt to which Co is added, thereby forming FeCO$_3$, bringing it into contact with an oxygen-containing gas to form FeOOH (iron oxyhydroxide; goethite), dehydrating and subsequently heat treating it, and then, conducting reduction.

Here, the ferrous salts include $FeCl_2$, $FeSO_4$ and $Fe(NO_3)_2$. $FeCl_2$ and $FeSO_4$ are preferably used among others. The alkali carbonates include $Na_2CO_3$, $K_2CO_3$, $NaHCO_3$, $(NH_4)_2CO_3$ and $NH_4HCO_3$.

First, Co is added to the solution of the ferrous salt. Specifically, a Co compound such as $CoSO_4$ or $CoCl_2$ is dissolved in the solution of the ferrous salt, and mixed by stirring.

Then, the alkali carbonate is added thereto for neutralization to obtain $FeCO_3$. At this time, the amount of the alkali carbonate is preferably 2 to 10 times larger than a necessary equivalent, because the branching of FeOOH obtained is reduced, and the final BET value of the magnetic metal powder is lowered. An oxidizing gas is further blown therein to form a slurry of FeOOH.

After filtration and washing with water, this slurry is returned into distilled water again to form a slurry again.

Then, a known Ni salt, a salt of group 2A in the periodic table such as a Ca salt, a Ba salt or a Sr salt, a Cr salt or a Zn salt may be allowed to coexist therein as a crystal regulating agent. The use of such a salt appropriately selected permits the shape of grains (axis ratio) to be controlled.

Further, it is necessary to add Al and Y or a rare earth element such as Nd, Sm, Pr, La, Ce, Dy, Gd or Tb to the magnetic metal powder used in the present invention. The addition of these components can prevent sintering in the subsequent reduction process, or improve the strength of the magnetic metal powder and play a crystal regulating role. As a sintering inhibitor other than these, it is possible to use Si in combination.

They are preferably introduced into the magnetic metal powder by adding an aqueous solution containing an Al compound and an aqueous solution containing a compound of Y or the above-mentioned rare earth element, to a slurry of FeOOH (iron oxyhydroxide; goethite) containing Co, and mixing the resulting mixture by stirring. However, an aqueous solution containing all of the Al compound and the compound of Y or the rare earth element may be prepared and added. The Al compounds include $Al_2(SO_4)_3$, $AlCl_3$, $Al(NO_3)_3$ and $NO_3AlNO_3$. The compounds of Y and the rare earth compounds include nitrates and chloride.

Co-containing FeOOH thus obtained is filtered and washed with water, and then, filtered again, followed by drying in a dryer.

Then, this is heat treated in an atmosphere of nitrogen at 400° C. to 700° C.

If the temperature is too low at this time, the number of pores formed in $\alpha$-$Fe_2O_3$ grains by dehydration is increased. As a result, the magnetic characteristics of the Fe magnetic metal powder after reduction are deteriorated, or the BET value becomes high. On the other hand, if the temperature is too high, the fusion of $\alpha$-$Fe_2O_3$ takes place, or the sintering thereof is initiated, which causes deformation thereof to deteriorate the characteristics of the resulting magnetic metal powder.

Further, when the temperature is elevated rapidly, the dehydration rapidly occurs, resulting in development of pores or formation of an uneven surface. Accordingly, in order to decrease the BET value, it is preferred that the heat treatment is conducted with a gradual increase in temperature. Furthermore, the reaction is preferably performed in a dilute state so that the temperature is uniformly applied.

After the heat treatment, the reduction is carried out. The reduction is preferably carried out with heating in a reducing atmosphere. As the reducing atmosphere, an atmosphere of hydrogen gas is generally preferred. The flow rate of the hydrogen gas can be appropriately selected. The heating temperature is about 300° C. to about 600° C.

The reduction process can be continuously conducted from $\alpha$-$Fe_2O_3$ to Fe. However, it is preferably conducted in several steps for obtaining the Fe magnetic metal powder having a high BET value.

In particular, the following process is preferably employed. That is, the reduction is once stopped at $Fe_2O_3$, the crystal structure is observed under a transmission electron microscope (TEM) to confirm the states of the pores and the surface, and then, it is determined whether $Fe_2O_3$ should be reduced to Fe, it should be further heat treated, or it should be oxidized to $\gamma$-$Fe_2O_3$, followed by the reduction again.

Such an improvement in the reduction process makes it possible to produce the Co-containing Fe magnetic metal powder composed of fine grains, high in $\sigma s$, and low in BET value.

The above-mentioned magnetic metal powder used in the present invention may contain a water-soluble inorganic ion such as Na, Ca, Fe or Ni in some cases, and the amount thereof is preferably 500 ppm or less, and more preferably 300 ppm or less. Although the pH of the magnetic metal powder is required to be optimized according to a combination with a binder, it is preferably 6 to 10. Further, the water content of the magnetic metal powder is 0.1 to 2%. The magnetic metal powder may be previously treated with a dispersing agent, a lubricant, a surfactant or an antistatic agent before dispersion.

In the present invention, the magnetic layer(s) may be formed on either one side of a support or both sides thereof. When the magnetic layer is only formed on one side of the support, a backcoat layer is preferably formed on the side opposite to the magnetic layer. In general, the magnetic layer is formed as a monolayer. However, two or more layers can also be formed. In this case, the magnetic layers may be formed by known methods, such as a wet-on-dry method in which a dried (and/or hardened) non-magnetic under layer is provided between the magnetic layers, and a wet-on-wet method in which the magnetic layers are simultaneously formed in a wet state. In such a case, as a manufacturing method for obtaining characteristics suitable for a digital magnetic recording material, the wet-on-dry method, the monolayer and the wet-on-wet method are preferred in this order (the wet-on-dry method is most preferred).

In the present invention, the materials described below may be appropriately selected and used in combination to provide the characteristics required for the magnetic layer, the backcoat layer and the non-magnetic under layer.

[Resins]

Binders used in the present invention include thermoplastic resins, thermosetting or reactive resins, electron beam sensitive modified resins and mixtures thereof. Of these, preferably used are combinations of vinyl chloride copolymers and polyurethane resins as shown below.

In addition to these resins, various known resins may be provided within the range of 20% by weight or less of the total.

[Vinyl Chloride Copolymers]

Examples of the resins used in the present invention include vinyl chloride copolymers. Specifically, copolymers having a vinyl chloride content of 60% to 95% by weight, particularly 60% to 90% by weight, is preferably used, and their average molecular weight is preferably about 100 to about 500.

Such vinyl chloride copolymers include vinyl chloride-vinyl acetate-vinyl alcohol copolymers, vinyl chloride-hydroxyalkyl (meth)acrylate copolymers, vinyl chloride-vinyl acetate-maleic acid copolymers, vinyl chloride-vinyl acetate-vinyl alcohol-maleic acid copolymers, vinyl chloride-vinyl acetate-hydroxyalkyl (meth)acrylate copolymers, vinyl chloride-vinyl acetate-hydroxyalkyl (meth)acrylate-maleic acid copolymers, vinyl chloride-vinyl acetate-vinyl alcohol-glycidyl (meth)acrylate copolymers, vinyl chloride-hydroxyalkyl (meth)acrylate-glycidyl (meth)acrylate copolymers, vinyl chloride-hydroxyalkyl (meth)acrylate-allyl glycidyl ether copolymers and vinyl chloride-vinyl acetate-vinyl alcohol-allyl glycidyl ether copolymers. In particular, copolymers of vinyl chloride and monomers containing epoxy (glycidyl) groups are preferred.

As such vinyl chloride copolymers, ones containing sulfuric acid groups and/or sulfo groups (hereinafter referred to as S-containing polar groups) are preferably used. In the S-containing polar groups (—$SO_4Y$ and —$SO_3Y$), Y may be either H or an alkali metal. In particular, Y is preferably K. That is, —$SO_4Y$ and —$SO_3Y$ are particularly preferred. Either one or both of these S-containing polar groups may be used. When both are contained, the ratio thereof may be any. These S-containing polar groups are preferably contained in a molecule in an amount of 0.01% to 10% by weight, and particularly in an amount of 0.1% to 5% by weight, in terms of atomic sulfur.

Resin skeletons to which these S-containing polar groups are attached are vinyl chloride resins, and can be obtained by polymerizing vinyl chloride, monomers having epoxy groups and other monomers copolymerizable therewith as so required in the presence of radical generating agents having S-containing strong acid radicals such as potassium persulfate and ammonium persulfate. The amount of these radical generating agents used is usually 0.3% to 9.0% by weight, and preferably 1.0% to 5.0% by weight, based on the monomers. Many of the radical generating agents are water-soluble, so that emulsion polymerization, suspension polymerization in which alcohols such as methanol are used as polymerization media, or solution polymerization in which ketones are used as solvents, is preferably used in polymerization.

In this case, in addition to the radical generating agents having S-containing strong acid radicals, radical generating agents used in usual polymerization of vinyl chloride can also be employed. Further, it is also possible to combine reducing agents such as sodium formaldehydesulfoxylate, sodium sulfite and sodium thiosulfate with the radical generating agents having S-containing strong acid radicals.

Further, —$OPO_2Y$ groups, —$PO_3Y$ groups, —COOY groups (Y is H or an alkali metal), amino groups (—$NR_2$) and —$NR_3Cl$ groups (R is H, methyl or ethyl) can also be contained as the polar groups in addition to the S-containing polar groups. Of these, the amino groups are preferably used alone or in combination with the —COOY groups in the backcoat layers, thereby achieving high dispersibility, high durability and and low friction.

Such amino groups may be used without the above-mentioned S-containing polar groups, and various kinds of amino groups may be used. In particular, dialkylamino groups (preferably, alkyl has 1 to 10 carbon atoms) are preferred. Such amino groups are usually obtained by amine modification, namely, by dispersing or dissolving vinyl chloride-alkylcarboxylic acid vinyl ester copolymers in organic solvents such as alcohols, and adding amine compounds (primary, secondary or tertiary amines such as aliphatic amines, alicyclic amines, alkanolamines and alkoxyalkylamines) and epoxy group-containing compounds for allowing the saponification reaction to easily proceed thereto to conduct the saponification reaction. The amount of vinyl units having the amino groups are 0.05% to 5% by weight, and ammonium salt groups may be used as necessary.

Further, examples of the monomers having epoxy groups include glycidyl ethers of unsaturated alcohols such as (meth)acryl glycidyl ether, glycidyl esters of (meth)acrylic acid such as glycidyl (meth)acrylate, glycidyl esters of unsaturated acids such as glycidyl p-vinylbenzoate, methylglycidyl itaconate, glycidyl ethylmaleate, glycidyl vinylsulfonate and glycidyl (meth)allylsulfonate, and epoxide olefins such as butadiene monooxide, vinylcyclohexene monooxide and 2-methyl-5,6-epoxyhexene. In general, the monomers having epoxy groups are used within such a range that the epoxy groups are contained in the copolymers in an amount of 0.5% by weight or more.

Known copolymerizable monomers can be used in such vinyl chloride copolymers as so required.

[Polyurethane Resins]

The polyurethane resins used in combination with such vinyl chloride resins are particularly effective in good wear resistance and adhesiveness to the supports. The above-mentioned vinyl chloride copolymers and the polyurethane resins are used preferably at a mixed ratio of 10:90 to 90:10, and more preferably at a mixed ratio of 70:30 to 50:50. In the binder used, at least two kinds of polyurethanes, each having a glass transition temperature (Tg) ranging from −20° C. to 80° C. and different in Tg, may be used so that the total amount thereof becomes 10% to 90% by weight of the whole binder. The polyurethane resins may have polar groups or hydroxyl groups on side chains. In particular, the polyurethane resins containing polar groups containing sulfur (S-containing groups) or phosphorus (P-containing groups) are preferred. The polyurethane resin is the general term for the resins obtained by the reaction of hydroxyl group-containing resins such as polyesterpolyols and/or polyetherpolyols with polyisocyanate-containing compounds and obtained by polymerizing raw materials for synthesis described in detail below so as to give a number average molecular weight of 5,000 to 200,000, and their Q value (weight average molecular weight/number average molecular weight) is about 1.5 to about 4.

The hydroxyl group-containing compounds used as raw materials for such polyurethane resins include polyalkylene glycols such as polyethylene glycol, polybutylene glycol and polypropylene glycol, alkylene oxide adducts of bisphenol A, various glycols and polyesterpolyols having hydroxyl groups at terminals of their molecular chains.

Carboxylic acid ingredients of the polyesterpolyols which similarly are raw materials include aromatic dicarboxylic acids such as terephthalic acid, isophthalic acid, orthophthalic acid and 1,5-naphthalic acid, aromatic oxycarboxylic acids such as p-oxybenzoic acid and p-(hydroxyethoxy) benzoic acid, and aliphatic dicarboxylic acids such as succinic acid, adipic acid, azelaic acid, sebacic acid and dodecanedicarboxylic acid, unsaturated fatty acids such as fumaric acid, maleic acid, itaconic acid, tetrahydrophthalic acid and hexahydrophthalic acid, alicyclic dicarboxylic acids, and tri- and tetracarboxylic acids such as trimellitic acid, trimesic acid and pyromellitic acid. Alcohol ingredients include ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,3-pentanediol, 1,4-cyclohexanedimethanol, alkylene oxide adducts of bisphenol A, alkylene oxide adducts of bisphenol A hydride, and compounds each having 2 to 4 hydroxyl groups such as polyethylene glycol, polypropylene glycol, polytetramethylene glycol, trimethylolethane, trimethylolpropane, glycerin and pentaerythritol. In addition to these, the alcohol ingredients also include lactone polyesterdiols obtained by ring-opening polymerization of lactones such as caprolactone.

The polyisocyanates used include diisocyanate compounds such as tolylene diisocyanate, phenylene diisocyanate, diphenylmethane diisocyanate, hexamethylene diisocyanate, tetramethylene diisocyanate, naphthalene diisocyanate, isophorone diisocyanate, xylylene diisocyanate, diisocyanate methylcyclohexane, diisocyanate cyclohexylmethane, dimethoxybiphenylene diisocyanate and diisocyanate diphenyl ether, and triisocyanate compounds such as a trimer of tolylene diisocyanate of 7 mol % or less of the total isocyanate groups and a trimer of hexamethylene diisocyanate.

As to the polar groups contained in these resins, the S-containing polar groups include —$SO_3M$ (sulfonic acid group) and —$SO_4M$ (sulfuric acid group), and the P-containing polar groups include =$PO_3M$ (phosphonic acid group), =$PO_2M$ (phosphinic acid groups), =POM (phosphinous acid group) —P=O($OM_1$)($OM_2$) and —OP=O($OM_1$)($OM_2$) (M, $M_1$ and $M_2$ represent H, Li, Na, K, —$NR_4$ or —$NHR_3$ wherein R represents an alkyl group or H). As the polar groups other than S and P, at least one polar group selected from —COOM, —$NR_3X$, (wherein M and R have the same meanings as given above, and X represents a halogen atom) —OH, —$NR_2$, =NH, =NR (R is a hydrocarbon group), an epoxy group, —SH and —CN is preferably introduced by copolymerization or the addition reaction. Of these, as M, Na is particularly preferred. These groups are preferably contained in molecules in an amount of 0.01% to 10% by weight, and particularly in an amount of 0.02% to 3% by weight, in terms of atoms. These groups may be present on main chains of the skeleton resins or on branched chains thereof.

Such urethane resins are obtained by reacting raw materials containing specific polar group-containing compounds and/or raw material resins reacted with specific polar group-containing compounds in solvents or, in the absence of solvents, by known methods.

Examples of the thermoplastic resins other than these include polyester resins, polyvinyl butyral, nitro-cellulose, epoxy resins and phenoxy resins, and particularly, they can be used in the backcoat layers.

[Curing Methods]

As crosslinking agents for curing (hardening) such resins by heating, various polyisocyanates can be used. It is preferred that a crosslinking agent in which at least one of tolylene diisocyanate, hexamethylene diisocyanate and methylene diisocyanate is a compound having a plurality of hydroxyl groups such as trimethylolpropane, or an isocyanulate crosslinking agent in which three molecules of a diisocyanate compound are combined with one another is used. The content of the crosslinking agent is preferably 10% to 30% by weight based on 100% by weight of resin. The binder resin and the hydroxyl groups contained therein are three-dimensionally combined by this crosslinking agent to improve the durability of the coated layer.

Specifically, the crosslinking agents include Coronate L, HL, 3041 and 2030 manufactured by Nippon Polyurethane Co., Ltd., 24A-100 and TPI-100 manufactured by Asahi Chemical Industry Co., Ltd., and Desmodule L and N manufactured by B. F. Goodrich Co.). They are used in an amount of 1% to 50% by weight based on the total amount of the above-mentioned resins.

In general, for curing (hardening) such reactive or thermosetting resins, the resins may be either heated in a heating oven at 50° C. to 80° C. for 6 to 100 hours, or allowed to pass through an oven at 80° C. to 120° C. at low speed.

It is also possible to use the resins in which electron beam sensitive modification is applied to the above-mentioned copolymers by introduction of (meth)acrylic double bonds according to known techniques. The use of such electron beam sensitive modified resins in the non-magnetic under layers by the wet-on-dry method is most preferred for improving the characteristics of the digital magnetic recording media.

As methods for conducting the electron beam sensitive modification, known are urethane modification in which a reaction product (adduct) of tolylene diisocyanate (TDI) and 2-hydroxyethyl (meth)acrylate (2-HEMA) is reacted with the resins, improved urethane modification in which monomers each having at least one ethylenic unsaturated double bond and one isocyanate groups in one molecule, and having no urethane bond in the molecule (such as 2-isocyanatoethyl (meth)acrylate) are reacted with the resins, and ester modification in which compounds having (meth)acrylic groups and carboxylic anhydrides or dicarboxylic acids are reacted with the resins having hydroxyl groups or carboxyl groups. Of these, the improved urethane modification is preferred, because an increase in the ratio of the vinyl chloride copolymers dose not result in brittleness, and paint films having excellent dispersibility and surface properties can be obtained.

The content of the electron beam functional groups is 1 to 40 mol %, and preferably 10 to 30 mol % in the hydroxyl group ingredients, from the viewpoint of stability in production and electron beam hardenability. In particular, in the case of the vinyl chloride copolymers, when the monomers are reacted so as to give 1 to 20 functional groups, preferably 2 to 10 functional groups, per molecule, the electron beam hardenable resins having excellent dispersibility and hardenability can be obtained. The acrylic double bond as used herein means a (meth)acryloyl group which is a residue of (meth)acrylic acid, a (meth)acrylate or a (meth)acrylic acid amide. Further, when these electron beam sensitive modified resins are used, known multifunctional acrylates may be mixed therewith in an amount of 1% to 50% by weight based on the total amount of the resins, for improving the crosslinking rate.

[Bases]

The supports used in the present invention include known films of polyesters such as polyethylene terephthalate (PET) and polyethylene naphthalate (PEN), polyolefins, polyamides, polyimides, polyamideimides, polysulfones, cellulose triacetate and polycarbonates. Of these, PET, PEN and aromatic polyamide films are preferred, and films of PEN alone, composite films produced by multilayer coextrusion of two or three kinds of PEN, and aromatic polyamide films are more preferred. The use of these films easily provides the balance of the electromagnetic characteristics, the durability, the friction characteristics, the film strength and the productivity.

Further, these supports preferably contain inorganic compounds such as oxides and carbonates of Al, Ca, Si and Ti, and organic compounds such as fine acrylic resin powders as fillers. It becomes possible to freely control the surface properties by adjusting the amount and size thereof, which makes it possible to control the electromagnetic characteristics, the durability, the friction characteristics and the like.

[Solvents]

There is no particular limitation on the solvents used in the present invention, which are appropriately selected, taking into consideration the solubility of the binders, the compatibility therewith and the drying efficiency. Examples of the solvents include ketones such as methyl ethyl ketone, methyl isobutyl ketone and cyclohexanone, aromatic hydrocarbons such as toluene and xylene, esters such as ethyl acetate and butyl acetate, alcohols such as isopropanol and butanol, and diluents or solvents such as dioxane, tetrahydrofurane, dimethylformamide, hexane and chlorine-substituted hydrocarbons. They may be used as single solvents or as mixed solvents with any mixing ratio.

[Lubricants]

In the present invention, of various known lubricants, fatty acids and/or fatty acid esters are preferably used as the lubricants. Preferred examples of the lubricants include monobasic fatty acids each having 12 to 24 carbon atoms (which may contain unsaturated bonds or may be branched), and monofatty acid esters, difatty acid esters and trifatty acid esters composed of monobasic fatty acids each having 10 to 24 carbon atoms (which may contain unsaturated bonds or may be branched) and any one of monovalent, divalent, trivalent, tetravalent, pentavalent and hexavalent alcohols, and cyclic and polysaccharide-reduced alcohols such as sorbitan and sorbitol. They may be used in combination. The content of the fatty acids and/or the fatty acid esters in the magnetic layers is 0.1% to 20% by weight, preferably 1% to 15% by weight, and more preferably 1% to 12% by weight as the total amount thereof based on ferromagnetic powders. When no ferromagnetic powders are present, they may be used in an amount of 0.01% to 100% by weight based on the binders. Besides the above-mentioned lubricants, compounds having lubricating, antistatic, dispersing or plasticizing effect can be used as the lubricants.

[Inorganic Powders]

Inorganic powders which can be used in the present invention include, for example, inorganic powders such as metals, metal oxides, metal carbonates, metal sulfates, metal nitrides, metal carbides and metal sulfides. Specifically, α-alumina, β-alumina, γ-alumina, θ-alumina, δ-alumina, dichromium trioxide, α-iron oxide, γ-iron oxide, goethite, $SiO_2$, ZnO, $TiO_2$, $ZrO_2$, $SnO_2$, silicon nitride, boron nitride, silicon carbide, titanium carbide, molybdenum carbide, boron carbide, tungsten carbide, calcium carbonate, barium carbonate, strontium carbonate, magnesium carbonate, barium sulfate, zinc sulfide, molybdenum disulfide, tungsten disulfide and artificial diamond are used alone or in combination. These inorganic compounds are used at a weight ratio ranging from 0.1% to 20% by weight based on the magnetic metal powders. When no magnetic metal powders are contained, they can be used within the range of 50% to 2000% by weight based on the binders.

[Carbon Black]

As carbon black which can be used in the present invention, furnace carbon black, thermal carbon black and acetylene black can be used, alone or in combination. The average size of these carbon black particles may be arbitrarily established, and suitably selected, taking into consideration the electric resistance and friction characteristics required for the media and the balance of an output at the shortest recording wavelength (surface roughness). The carbon black may be in a single system or in a mixed system. The particle-size distribution can also be selected independently. The average particle size of such carbon black is 10 nm to 400 nm, and preferably 20 nm to 350 nm. More specifically, when the electromagnetic characteristics are preferentially considered, the average particle size is preferably 20 nm to 40 nm. When importance is given to the friction characteristics, it is preferred that carbon black having a particle size as large as allowable in the electromagnetic characteristics within the range of 40 nm to 350 nm be used. Further, the BET value of carbon black is 100 $m^2/g$ to 500 $m^2/g$, and preferably 150 $m^2/g$ to 400 $m^2/g$, and the dibutyl phthalate (DBP) oil absorption is 20 ml/l to 400 ml/l, and preferably 30 ml/l to 200 ml/l. However, the average particle size, the BET value and the DBP oil absorption of carbon black are closely related, so that it is unrealizable to independently select values widely different from one another. It is necessary to select experimentally according to the required characteristics of these three elements and the dispersing characteristics and flow characteristics of paints.

The carbon black is used at a weight ratio of 10% to 500% by weight based on the binder, or within the range of 0.1% to 20% by weight based on the magnetic metal powder. However, it is necessary to experimentally select the amount of the carbon black used, according to the required characteristics of the media and the dispersing characteristics and flow characteristics of the paints.

When the magnetic layers are extremely thin as the digital magnetic recording media, the particle size and the amount added of the above-mentioned inorganic powders and carbon black are closely related to the thickness of the magnetic layers and the structure of the media. When the thickness of the magnetic layers is as thin as 0.5 μm or less, it is necessary to increase the particle size and the amount added of the inorganic powders and carbon black which are pigments added, in the order of (1) the monolayer method, (2) the wet-on-dry method and (3) the wet-on-wet method. In particular, such changes with respect to the inorganic powders are performed from the viewpoint of securing the electromagnetic characteristics and the reliability, and preferred ranges in each method are as follows. In (1) the monolayer method, the magnetic layer is directly formed on the base film, so that the influence of the particle size and the amount added of the inorganic powder is great. Accordingly, the inorganic powder is required to have a particle size of 0.05 μm to 0.18 μm, and to be added in an amount of 1 part to 8 parts by weight based on 100 parts by weight of magnetic metal powder. In (2) the wet-on-dry method, the magnetic layer is formed on the dried and/or hardened non-magnetic under layer, so that the influence of the inorganic powder is somewhat reduced by the under layer. Accordingly, the inorganic powder is required to have a particle size of 0.08 μm to 0.22 μm, and to be added in an amount of 3 parts to 10 parts by weight based on 100 parts by weight of magnetic metal powder. In (3) the wet-on-wet method, the magnetic layer is formed on the wet non-magnetic under layer, so that the inorganic powder is buried in the under layer to reduce the influence. Accordingly, the inorganic powder is required to have a particle size of 0.18 μm to 0.35 μm, and to be added in an amount of 5 parts by weight or more based on 100 parts by weight of magnetic metal powder. The wet-on-dry method is most preferred, because such materials are easily available and the characteristics of the media are easily improved.

The present invention will be further described with reference to the following examples, which are, however, not to be construed as limiting the invention.

(Production of Magnetic Metal Powders)

PRODUCTION EXAMPLE 1-1

In 10 liters of water ($H_2O$) maintained at 45° C., 1000 g (5.0 mol) of $FeCl_2 \cdot 4H_2O$ were dissolved, and $CoCl_2$ dissolved therein so as to give a Co amount of 25% by weight based on Fe, followed by stirring. An aqueous solution obtained by dissolving 865 g (9.0 mol) of $(NH_4)_2CO_3$ in 10 liters of $H_2O$ and heated to 45° C. was gradually added to this solution with stirring to obtain a suspension. The resulting suspension was further stirred for 60 minutes. The stirring of this suspension was continued for 6 hours while keeping the temperature thereof at 45° C. and blowing air therein at a flow rate of 10 liters/minute. Then, the suspension was allowed to cool down to room temperature, and filtered. The residue was washed with water, and dried at 60° C. for 24 hours to obtain needle-like Co-containing FeOOH (length of major axis: 0.15 μm, axis ratio: 15).

Then, 100 g of Co-containing FeOOH thus obtained were put into 6 liters of $H_2O$, and mixed by stirring. One liter of an aqueous solution was added thereto in which $Y(NO_3)_3$ was dissolved so as to give a Y amount of 3 at % based on Fe, and $Al_2(SO_4)_3$ was dissolved so as to give an Al amount of 4.0% by weight based on Fe, and $CO_2$ gas was further blown therein so as to give a pH of 8. After sufficient stirring, filtration and washing with water were carried out, followed by drying.

Surface-treated Co-containing FeOOH thus obtained was heat treated for 3 hours in an atmosphere of nitrogen under such conditions that the temperature was uniformly applied thereto. Then, 50 g thereof were collected, and reduced to Co-containing $Fe_3O_4$ at 600° C. at a hydrogen flow rate of 1 liter/minute. The surface state of this Co-containing $Fe_3O_4$ was confirmed under a TEM.

The Co-containing $Fe_3O_4$ thus obtained was reduced at 480° C. at a hydrogen flow rate of 1 liter/minute for 8 hours. Then, after cooling to room temperature, air was gradually flowed in the nitrogen gas to form an oxide film on a surface of the magnetic layer, thereby obtaining a Co-containing magnetic metal powder. The length of the major axis thereof was 0.11 μm, the Hc was 2215 Oe, the BET value was 44 $m^2/g$, and the σs was 150 emu/g.

PRODUCTION EXAMPLES 1-2 TO 1-7 AND 1-9 TO 1-12

In the magnetic powder obtained in Production Example 1-1, the amounts of the additives were changed as shown in Table 1, which was accompanied by slight changes in the process conditions. Thus, Co-containing magnetic metal powders having the characteristics shown in Table 1 were produced.

PRODUCTION EXAMPLE 1-8

$NdCl_3 \cdot 6H_2O$ was added so as to give a Nd amount of 6 at % based on Fe, in place of $Y(NO_3)_3$ used in Production Example 1-7.

These are each shown in Table 1 as Examples 1-1 to 1-12.

COMPARATIVE PRODUCTION EXAMPLE 1-1

A Co-containing magnetic metal powder was prepared in the same manner as with Production Example 1-1 with the exception that the Co-containing FeOOH was continuously reduced at 480° C. at a hydrogen flow rate of 1 liter/minute for 10 hours, thereby reducing it to Fe in one step. This is shown in Table 2 as Comparative Example 1-1.

COMPARATIVE PRODUCTION EXAMPLES 1-2 TO 1-12

In Comparative Production Example 1-1, the amounts of the additives were changed, which was accompanied by changes in the process conditions, and similarly to Comparative Example 1-1, the Co-containing FeOOH was continuously reduced at 480° C. at a hydrogen flow rate of 1 liter/minute for 10 hours, thereby reducing it to Fe in one step. Thus, Co-containing magnetic metal powders were produced. These are each shown in Table 2 as Comparative Examples 1-2 to 1-12.

(Magnetic Layer)

(Production of Paint from Magnetic Metal Powder)

| | |
|---|---|
| Magnetic metal powder: (Shown in the tables) | 100.0 |
| Resins: Vinyl chloride copolymer, MR110, manufactured by Nippon Zeon Co., Ltd. (vinyl chloride/2HEMA/AGE/molecular terminal $OSO_3K$ group = 84.5/4.5/7.4/0.36, polymerization degree: 300) | 7.7 |
| Polyesterpolyurethane resin, UR8700, manufactured by Toyobo Co., Ltd. (Mn: 20,000, containing $SO_3Na$ groups) | 7.7 |
| Dispersing agent: Organic phosphoric acid compound, RE610, manufactured by Toho Chemical Industry Co., Ltd. | 3.0 |
| Abrasive: α-Alumina, HIT60A, manufactured by Sumitomo Chemical Co., Ltd. (average particle size: 0.20 μm) | 3.0 |
| Additive: Carbon black, CF9B, manufactured by Mitsubishi Chemical Corporation (primary particle size: 40 nm, BET: 60 $m^2/g$, oil absorption: 64 ml/100 g) | 0.2 |
| Lubricants: Fatty acid, NAA180, manufactured by Nippon Oil and Fats Co., Ltd. | 1.2 |
| Fatty acid ester, NIKKOL BS, manufactured by Nikko Chemicals Co., Ltd. | 1.2 |
| Curing Agent: TDI Isocyanurate, C-2030, manufactured by Nippon Polyurethane Co., Ltd. | 3.1 |
| NV = 20% | |
| Solvent ratio: MEK/toluene/cyclohexanone = 1/1/2 | |

After all or a part of the above-mentioned materials were kneaded with a kneader, they were dispersed in a horizontal pin type mill, and finally, the viscosity was controlled with the solvent.

(Non-magnetic Under Layer)

| | |
|---|---|
| Pigments: α-Iron oxide, T-50α, manufactured by Kanto Denka Kogyo Co., Ltd. (BET: 49 $m^2/g$, stearic acid adsorption: 85 mg/g, amount of surface treatment: Al/Si = 1.0/0.7 wt %) | 80.0 |
| Carbon black, R760, manufactured by Colombian Carbon Co. (primary particle size: 30 nm, BET: 70 $m^2/g$, oil absorption: 48 ml/100 g) | 20.0 |
| Resins: EB-modified vinyl chloride copolymer, TB0246, manufactured by Toyobo Co., Ltd. (EB modification of basic skeleton resin, MR110, manufactured by Nippon Zeon Co., Ltd., by improved urethane modification) | 9.6 |
| EB-modified polyesterpolyurethane, TB0242, manufactured by Toyobo Co., Ltd. (Mn: 20,000, containing phosphoric polar groups) | 7.7 |
| EB-functional polyether-polyesterpolyurethane resin, S-0171, manufactured by Japan Synthetic Rubber Co., Ltd. (Mn = 20,000, 12 acrylic functional groups/molecule) | 1.9 |
| Dispersing agent: Organic phosphoric acid compound, RE610, manufactured by Toho Chemical Industry Co., Ltd. | 3.0 |
| Abrasive: α-Alumina, HIT50, manufactured by Sumitomo Chemical Co., Ltd. (average particle size: 0.25 μm) | 8.0 |
| Lubricants: Fatty acid, NAA180, manufactured by Nippon Oil and Fats Co., Ltd. | 1.0 |
| Fatty acid ester, NIKKOL BS, manufactured by Nikko Chemicals Co., Ltd. | 1.0 |
| NV = 34% | |
| Solvent ratio: MEK/toluene/cyclohexanone = 2/2/1 | |

After all or a part of the above-mentioned materials were kneaded with a kneader, they were dispersed in a horizontal pin type mill, and finally, the viscosity was controlled with the solvent.

(Backcoat Layer)

| | |
|---|---:|
| Pigments: Carbon black, #3170B, manufactured by Mitsubishi Chemical Corporation (primary particle size: 25 nm, BET: 180 m²/g, oil absorption: 114 ml/100 g) | 100.0 |
| Carbon black, Sevacurve MT manufactured by Colombian Carbon Co. (particle size: 350 nm, BET: 7 m²/g) | 1.2 |
| Abrasive: α-Iron oxide, TF100, manufactured by Toda Kogyo Corp. (average particle size: 0.2 μm) | 0.8 |
| Resins: Vinyl chloride copolymer, MPR-TA, manufactured by Nisshin Kagaku Kogyo Co., Ltd. (vinyl chloride/vinyl acetate/vinyl alcohol, polymerization degree: 420) | 66.7 |
| Vinyl chloride copolymer, MPR-ANO, manufactured by Nisshin Kagaku Kogyo Co., Ltd. (vinyl chloride/vinyl acetate/vinyl alcohol, polymerization degree: 340, N atom content: 390 ppm) | 20.0 |
| Polyesterpolyurethane resin, TS9555, manufactured by Toyobo Co., Ltd. (Mn: 40,000, containing SO₃Na groups) | 46.6 |
| Curing Agent: 3-TDI molecule adduct of trimethylolpropane, C-3041, manufactured by Nippon Polyurethane Co., Ltd. NV = 10% Solvent ratio: MEK/toleune/cyclohexanone = 2/2/1 | 20.0 |

After all or a part of the above-mentioned materials were stirred with a high-speed agitator, they were dispersed in a horizontal pin type mill, and finally, the viscosity was controlled with the solvent.

(Coating)

A 5.0-μm thick polyethylene naphthalate support (PEN film Q11, manufactured by Teijin Ltd.) was coated with a non-magnetic under layer by use of a nozzle so as to give a thickness of 1.4 μm after calendering, followed by calendering and further EB irradiation. At this time, the Ra of the under layer was 2.9 nm. The non-magnetic under layer thus formed was coated with a magnetic paint film by use of a nozzle so as to give a thickness of 0.15 μm after treatment, followed by orientation, drying and calendering. Further, a backcoat layer was formed so as to give a thickness of 0.5 μm and dried.

A resulting tape film thus prepared was cured by heating at 60° C. for 48 hours, and then, slit to a width of 6.35 mm to produce a tape for a digital video cassette (DVC).

The characteristics of each tape are shown in Tables 1 and 2.

TABLE 1

| Examples | 1-1 | 1-2 | 1-3 | 1-4 | 1-5 | 1-6 | 1-7 | 1-8 | 1-9 | 1-10 | 1-11 | 1-12 |
|---|---|---|---|---|---|---|---|---|---|---|---|---|
| goethite long axis | 0.15 | 0.13 | 0.15 | 0.13 | 0.12 | 0.12 | 0.13 | 0.13 | 0.15 | 0.15 | 0.13 | 0.13 |
| Co (wt % to Fe) | 25 | 30 | 25 | 30 | 30 | 30 | 30 | 30 | 20 | 20 | 40 | 40 |
| Al (wt % to Fe) | 4 | 4 | 4 | 4 | 5 | 5 | 3 | 3 | 3 | 3 | 5 | 5 |
| Y (wt % to Fe) | 3 | 3 | 3 | 3 | 5 | 5 | 6 | Nd 6 | 3 | 3 | 5 | 5 |
| Reducing conditions | multiple | multiple | multiple | multiple | multiple | multiple | multiple | multiple | multiple | multiple | multiple | multiple |
| long axis | 0.11 | 0.10 | 0.11 | 0.10 | 0.08 | 0.08 | 0.10 | 0.10 | 0.11 | 0.11 | 0.10 | 0.10 |
| Dx | 180 | 170 | 180 | 170 | 165 | 165 | 170 | 170 | 195 | 195 | 180 | 180 |
| Hc | 2215 | 2260 | 2300 | 2350 | 2420 | 2350 | 2290 | 2270 | 2170 | 2230 | 2320 | 2400 |
| σs | 150 | 153 | 155 | 158 | 156 | 161 | 159 | 157 | 148 | 153 | 161 | 165 |
| BET | 44 | 45 | 41 | 42 | 42 | 39 | 41 | 42 | 42 | 39 | 44 | 41 |
| Δσs | 7% | 6% | 5% | 5% | 4% | 3% | 4% | 4% | 7% | 6% | 3% | 3% |
| dispersibility | ○ | ○ | ○ | ○ | ○ | ○ | ○ | ○ | ○ | ○ | ○ | ○ |
| coating quality | ○ | ○ | ○ | ○ | ○ | ○ | ○ | ○ | ○ | ○ | ○ | ○~Δ |
| 1/2 Tb output | +0.2 | +0.4 | +0.7 | +0.8 | +1.0 | +1.0 | +0.9 | +0.7 | +0.0 | +0.2 | +1.0 | +1.2 |
| 1/4 Tb output | +0.2 | +0.4 | +0.7 | +1.0 | +0.8 | +1.3 | +1.0 | +0.8 | +0.2 | +0.4 | +1.4 | +1.7 |
| C/N | +0.1 | +0.5 | +0.2 | +0.6 | +0.9 | +0.9 | +0.5 | +0.4 | −0.2 | +0.0 | +0.3 | +0.5 |
| within four formula? | ○ | ○ | ○ | ○ | ○ | ○ | ○ | ○ | ○ | ○ | ○ | ○ | magnetic layer: 0.15 μm
non-magnetic layer: 1.4 μm
base: Q11-5.0 μm

TABLE 2

| Comparative Examples | 1-1 | 1-2 | 1-3 | 1-4 | 1-5 | 1-6 | 1-7 | 1-8 | 1-9 | 1-10 | 1-11 | 1-12 |
|---|---|---|---|---|---|---|---|---|---|---|---|---|
| goethite long axis | 0.12 | 0.13 | 0.13 | 0.13 | 0.12 | 0.15 | 0.20 | 0.25 | 0.15 | 0.15 | 0.15 | 0.13 |
| Co (wt % to Fe) | 30 | 30 | 30 | 30 | 30 | 20 | 5 | 15 | 20 | 30 | 30 | 40 |
| Al (wt % to Fe) | 5 | 4 | 4 | 4 | 5 | 3 | 4 | 3 | 3 | 4 | 0 | 5 |
| Y (wt % to Fe) | 5 | 3 | 3 | 3 | 5 | 3 | 0 | 3 | 3 | 6 | 6 | 5 |
| Reducing conditions | single step | single step | single step | single step | single step | single step | single step | single step | single step | single step | single step | single step |
| long axis | 0.08 | 0.10 | 0.10 | 0.10 | 0.08 | 0.11 | 0.13 | 0.18 | 0.11 | 0.12 | 0.13 | 0.10 |
| Dx | 165 | 170 | 170 | 170 | 165 | 195 | 185 | 195 | 195 | 205 | 210 | 180 |
| Hc | 2020 | 2180 | 2250 | 2300 | 2235 | 1850 | 1790 | 1975 | 2130 | 2310 | 2045 | 2275 |
| σs | 139 | 144 | 146 | 150 | 143 | 134 | 140 | 146 | 145 | 162 | 151 | 151 |
| BET | 57 | 52 | 51 | 48 | 51 | 54 | 36 | 38 | 44 | 57 | 60 | 54 |
| Δσs | −13% | −11% | −11% | −10% | −11% | −13% | −17% | −10% | −10% | −10% | −22% | −10% |
| dispersibility | Δ | Δ | Δ | Δ | Δ | ○ | ○ | ○ | Δ | × | × | Δ |
| coating quality | ○ | Δ | Δ | Δ | ○ | ○ | ○ | Δ | Δ | × | × | ▲ |
| 1/2 Tb output | −1.8 | −0.9 | −0.8 | −0.4 | −1.0 | −2.8 | −3.3 | −2.5 | −1.1 | −1.3 | −1.5 | −0.6 |
| 1/4 Tb output | −0.7 | −0.4 | −0.2 | +0.2 | −0.4 | −1.4 | −0.6 | −0.9 | −0.3 | +0.8 | +0.0 | +0.2 |
| C/N | −1.2 | −1.3 | −1.3 | −0.6 | −0.5 | −2.3 | −2.7 | −2.2 | −1.5 | −2.1 | −2.3 | −0.8 |
| within four formula? | × | × | × | × | × | × | × | × | × | × | × | × |

TABLE 2-continued

| Comparative Examples | 1-1 | 1-2 | 1-3 | 1-4 | 1-5 | 1-6 | 1-7 | 1-8 | 1-9 | 1-10 | 1-11 | 1-12 |
|---|---|---|---|---|---|---|---|---|---|---|---|---|
| Formula when not within the four formula | C | C | C | C | C | C | B | B | C | A | A | C |

A: $y > 0.05 x^2 - 6x + 330$
B: $y < 0.05 x^2 - 6x + 310$
C: $y < 0.05 x^2 - 6x + 330$
$y > 0.05 x^2 - 6x + 310$
$y < x + 104$

EXAMPLE 2-1

A tape was produced in the same manner as with Example 1-1 with the exception that the abrasive is changed to 3.0 parts by weight of HIT80 manufactured by Sumitomo Chemical Co., Ltd. (particle size: 0.09 μm) in the magnetic metal powder of Example 1-5, and a 6.4-μm thick polyethylene naphthalate support (PEN film Q11, manufactured by Teijin Ltd.) was directly coated with the magnetic paint by use of a nozzle so as to give a thickness of 0.15 μm after treatment. Results are shown in Table 3.

EXAMPLE 2-2

A tape was produced in the same manner as with Example 1-1 with the exception that the abrasive is changed to 7.0 parts by weight of HIT50 manufactured by Sumitomo Chemical Co., Ltd. (particle size: 0.25 μm) in the magnetic metal powder of Example 1-5, the solvent ratio was changed to MEK/toluene/cyclohexanone=2/2/1, a 5.0-μm thick polyethylene naphthalate support (PEN film Q11, manufactured by Teijin Ltd.) was coated with the non-magnetic under layer of Example 1-1 in which the NV was changed to 37%, so as to give a thickness of 1.4 μm after calendering, and the non-magnetic under layer in a wet state was coated with the magnetic paint so as to give a thickness of 0.15 μm after treatment. Results are shown in Table 3.

TABLE 3

| | single layer Example 2-1 | W/D Example 1-5 | W/W Example 2-2 |
|---|---|---|---|
| goethite long axis | 0.12 | 0.12 | 0.12 |
| Co (wt % to Fe) | 30 | 30 | 30 |
| Al (wt % to Fe) | 5 | 5 | 5 |
| Y (wt % to Fe) | 5 | 5 | 5 |
| long axis | 0.08 | 0.08 | 0.08 |
| Dx | 165 | 165 | 165 |
| Hc | 2420 | 2420 | 2420 |
| σs | 156 | 156 | 156 |
| BET | 42 | 42 | 42 |
| Δσs | 4% | 4% | 4% |
| dispersibility | ○ | ○ | ○ |
| coating quality | ○ | ○ | ○ |
| 1/2 Tb output | +0.7 | +1.0 | +0.4 |
| 1/4 Tb output | +0.7 | +0.8 | +0.4 |
| C/N | +0.6 | +0.9 | +0.4 |
| Solvent Ratio in the magentic layer | M/T/C = 1/1/2 | M/T/C = 1/1/2 | M/T/C = 2/2/1 |
| NV of non-magnetic layer | — | 34% | 37% |

In the present invention, the characteristics were measured by the following methods.
(Measurement)
Electromagnetic Characteristics
  Output
  The signals of 20.96 MHz (½ Tb) and 10.48 MHz (¼ Tb) were recorded with a Matsushita DVC camera, NV-DJ1, and outputs at the time when the signals were reproduced were measured. The tape position was in an MP mode. 0 dB at that time is an output at each frequency of a DVC-Ref tape.
  C/N
  The signal of 20.96 MHz was recorded with a Matsushita DVC camera, NV-DJ1, and the ratio of the reproduced signal of 19.96 MHz at the time when this signal was reproduced was measured.
  Coating Quality
  A resulting film (magnetic layer+(non-magnetic under layer)+base) before BC coating was illuminated with an OHP projector, and a transmitted surface was observed. The coating quality was evaluated based on the following criterion:
  ○: Uniform
  ×: Non-uniform and showing extremely mottled appearance
  Δ: Intermediate therebetween
  Δσs
  The rate of σs decrease of a magnetic metal powder after keeping it under the circumstance of 60° C. and 90% for 24 hours was measured.

As shown in the tables, the magnetic metal powders having excellent dispersibility and coating quality can be obtained by selecting the σs and the BET value thereof by the specific equations, with the magnetic powders having high magnetic energy. Accordingly, the medium frequency (¼ Tb output) and high frequency (½ Tb output) outputs necessary for the digital media can be improved. Further, the crystallite size (Dx) is small to the σs, so that the noise (C/N) is reduced. Furthermore, the BET value is low, and the surfaces of the magnetic powders are uniform and dense. Accordingly, the shelf-stability of the magnetic powders also is improved.

What is claimed is:

1. A magnetic recording medium having a magnetic layer formed on a non-magnetic support or a non-magnetic under layer, said magnetic layer comprising a magnetic metal powder containing iron (Fe) as a main component, 18 to 40% by weight of Co based on iron, Al and Y or a rare earth element, and having a specific surface area (x) by the BET method not exceeding 60 m²/g, in which said magnetic metal powder has a saturation magnetization (σs) (y) and a specific surface area (x) by the BET method within the range bounded by the following four equations:

$y=0.05x^2-6x+330$ (1)

$y=0.05x^2-6x+310$ (2)

$y=x+126$ (3)

$y=x+104$ (4).

2. The magnetic recording medium according to claim 1, in which said rare earth element is one or more selected from the group consisting of Nd, Sm, Pr, La, Ce, Dy, Gd and Tb.

3. The magnetic recording medium according to claim 1, in which the magnetic metal powder contains 500 ppm or less soluble inorganic ion.

4. The magnetic recording medium according to claim 1, in which the magnetic metal powder has pH 6 to 10.

5. The magnetic recording medium according to claim 1, in which the magnetic metal powder has 0.1 to 2% water.

6. The magnetic recording medium according to claim 1, in which the magnetic layer containing the magnetic metal powder is formed on the non-magnetic underlayer by wet-on-dry method.

7. The magnetic recording medium according to claim 1, in which the non-magnetic underlayer has been cured by EB irradiation.

8. The magnetic recording medium according to claim 1, in which the magnetic layer is 0.2 $\mu$m or less thick and the non-magnetic underlayer is 1.0 to 2.0 $\mu$m thick.

9. The magnetic recording medium according to claim 1 for use as a digital recording medium.

10. The magnetic recording medium according to claim 1 for which recording wavelength is 0.2 to 0.6 $\mu$m.

11. The magnetic recording medium according to claim 1 in which $\sigma s/Dx$ of the magnetic metal powder is 0.90 or more.

* * * * *